Aug. 10, 1948.  J. E. STREETS, JR  2,446,561
COMBINATION SQUARE
Filed July 11, 1946
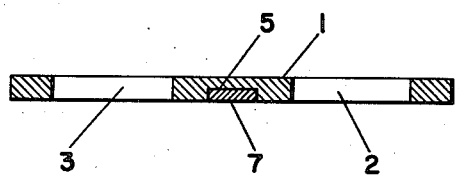
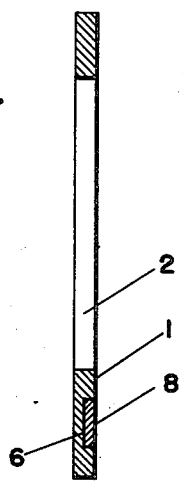
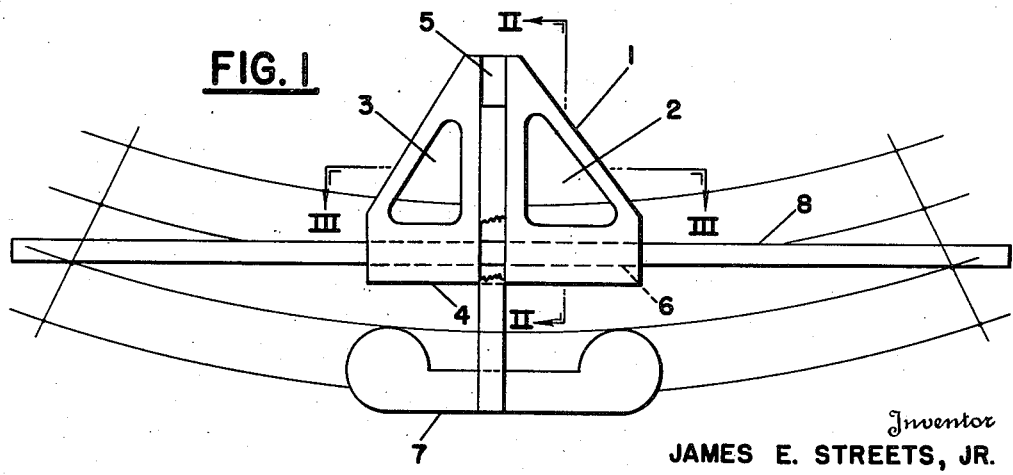
Inventor
JAMES E. STREETS, JR.

Patented Aug. 10, 1948

2,446,561

UNITED STATES PATENT OFFICE 2,446,561

COMBINATION SQUARE

James E. Streets, Jr., Charleston, S. C.

Application July 11, 1946, Serial No. 682,758

1 Claim. (Cl. 33—95)

(Granted under the act of March 3, 1883, as amended April 30, 1928; 370 O. G. 757)

This invention relates to a combination instrument for use in development of shell plating for ships.

In the construction and repair of ships, it is customary to develop full size plans of various elements including the many pieces of shell plating necessary. From these plans there are constructed templates for use in the shops, for instance to compare the plate during the bending and forming operations in order to determine when it has achieved its proper curvature.

In order to find the centers of the plates, it has been customary to make use of three separate instruments. For example, a bow square, a straight edge, and a framing square will be handled simultaneously. This is awkward and time-consuming and constitutes a frequent source of error in the center determination. The present invention embodies a combination square performing the functions of the three instruments previously used, and in a more efficient manner. By its use accuracy is improved and a significant amount of time may be saved in any job.

Figure 1 is a plan view of the combination square in use.

Figure 2 is a section on line II—II of Figure 1.

Figure 3 is a section of line III—III of Figure 1.

The main portion of the combination square consists of a roughly triangular portion 1 cut out at 2 and 3 for purposes of lightening and easier handling. Perpendicular to the base 4 and on the upper side of the body 1 as shown in Figure 1 is a groove 5 having one side spaced half away along the base. On the underneath side is a similar groove 6 parallel to the base. These grooves 5 and 6 are of a depth approximately half the thickness of the body, (Figures 2 and 3) and at their intersection there is an opening through the body, as shown in Figure 1. In use, a bow square 7 is slidably mounted in groove 5 and a straight edge 8 is slidably mounted in groove 6. In accordance with well-known geometrical principles, if the straight edge be placed so as to touch the ends of a curve and the base 1 and the bow square be manipulated until the bow square touches the curve at two points as shown, then the edges of the straight portion of the bow square will bisect the curve thus locating its center.

If the straight-edge be graduated, it may be read against the square body where it shows through groove 5.

Certain changes may be embodied in the tool described without departing from the spirit of the invention. For example, it may be desired to make the slots in dove-tail fashion rather than as shown. This would result in holding the three elements together allowing only sliding motion of the bow square and straight edge.

The invention described herein may be manufactured and used by or for the Government of the United States of America for governmental purposes without the payment of any royalties thereon or therefor.

I claim:

A combination square comprising a flat, relatively thin body portion grooved on opposite sides by perpendicularly intersecting grooves of such depths as to form an opening through the body portion at the intersection, a graduated straight-edge slidably mounted in one of said grooves so that its graduations are visible through the opening, and a bow square slidably mounted in the second groove.

JAMES E. STREETS, JR.

REFERENCES CITED

The following references are of record in the file of this patent:

UNITED STATES PATENTS

| Number | Name | Date |
|---|---|---|
| 1,630,414 | Baier | May 31, 1927 |
| 1,969,758 | McCoy | Aug. 14, 1934 |